June 12, 1934.   P. F. SHIVERS   1,962,620
MODULATING MOTOR
Filed May 4, 1931   2 Sheets-Sheet 1

Inventor
Paul F. Shivers
By Hood & Hahn
Attorneys

June 12, 1934.　　　P. F. SHIVERS　　　1,962,620

MODULATING MOTOR

Filed May 4, 1931　　　2 Sheets-Sheet 2

Inventor
Paul F. Shivers
By Hood & Hahn
Attorneys

Patented June 12, 1934

1,962,620

UNITED STATES PATENT OFFICE 1,962,620

MODULATING MOTOR

Paul F. Shivers, Wabash, Ind., assignor to Minneapolis-Honeywell Regulator Company, Minneapolis, Minn., a corporation of Delaware Application May 4, 1931, Serial No. 535,008

26 Claims. (Cl. 236—68)

The object of my invention is to produce a device having a power delivery element which may be automatically positioned at an infinite number of points within a predetermined range in response to variations in condition at a remote point.

The accompanying drawings illustrate my invention.

Figure 1:
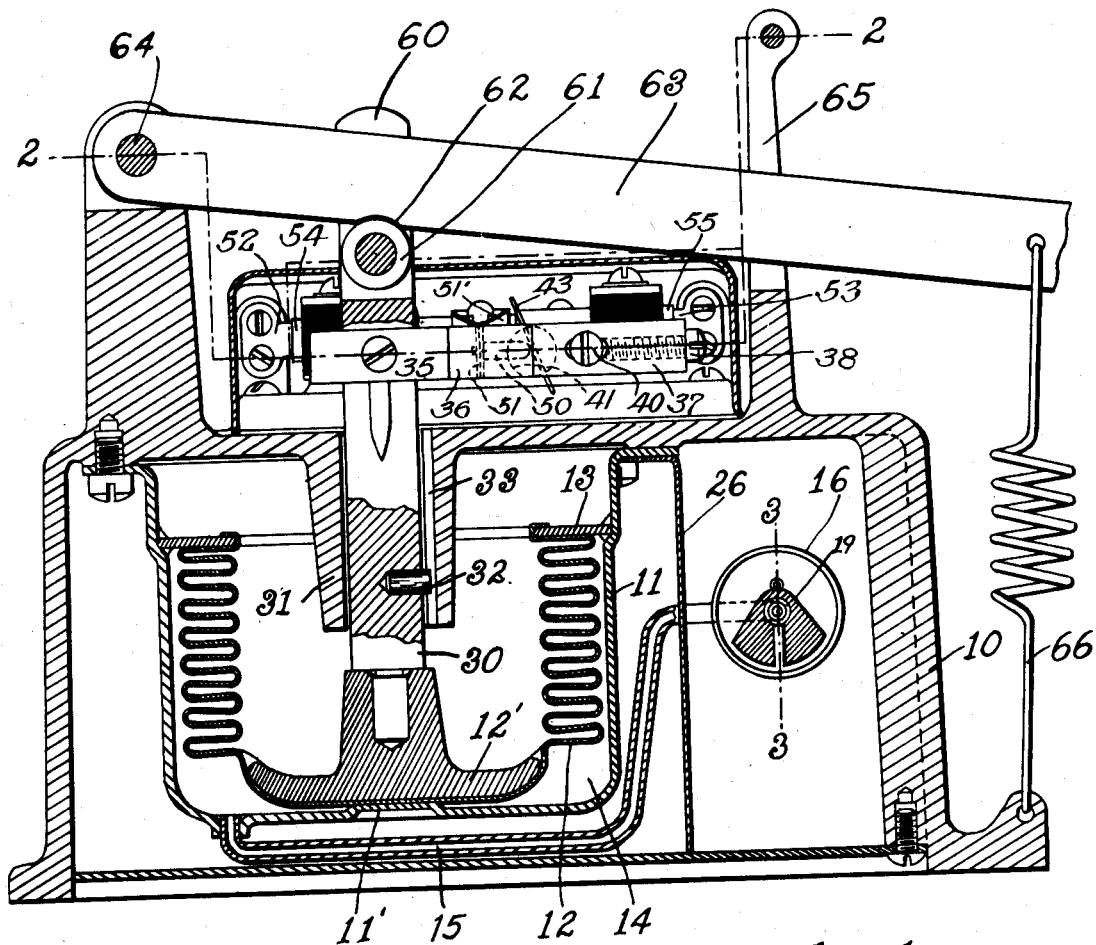
Figure 3:
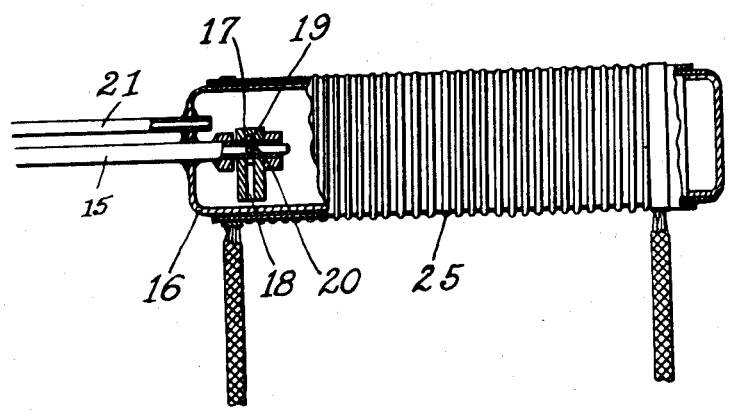
Figure 2:
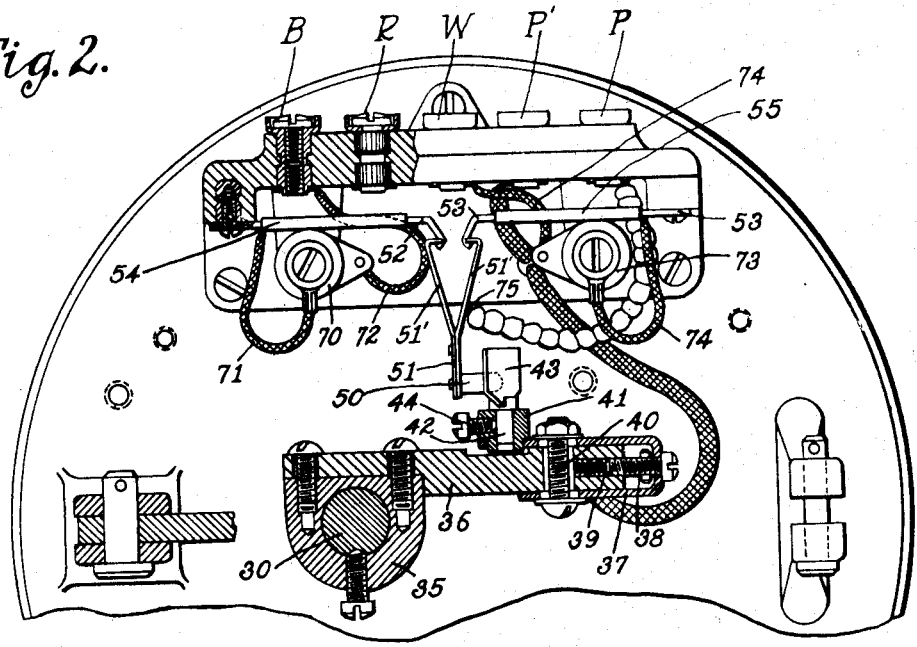
Figure 4:
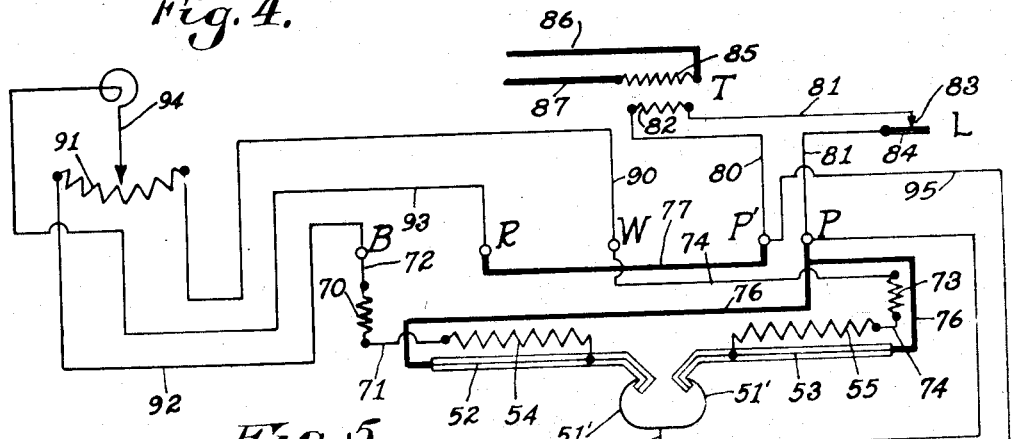
Figure 5:
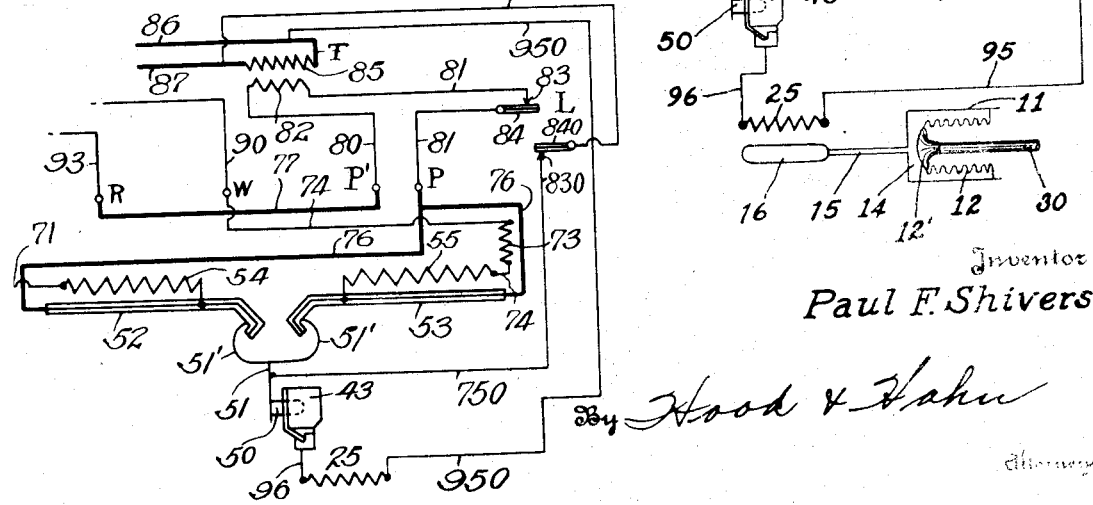

Fig. 1 is a medial section of the desirable form of motor element forming part of my invention;

Fig. 2 a section on line 2—2 of Fig. 1;

Fig. 3 a fragmentary section on line 3—3 of Fig. 1;

Fig. 4 a wiring diagram, and Fig. 5 a wiring diagram of a slight modification.

In the drawings 10 indicates a hollow main body within which is mounted a cup 11 having mounted therein an expansible and collapsible bellows 12, sealed in cup 11 by ring 13, in order to form a chamber 14 within which a desired quant'ty of volatile liquid may be contained. The bottom of cup 11 is provided with a slight upward projection 11' arranged to limit the expansible movement of the closed head 12' of bellows 12.

Leading into the bottom of cup 11 is a small tube 15 which communicates with a capsule 16, preferably axially thereof, at one end. Tube 15 projects a short distance into capsule 16 and journaled on the tube is an unbalanced feed head 17 the outer end of which lies close to the wall of capsule 16. A passage 18 leads from the outer end of head 17 inwardly to an annular chamber 19 surrounding tube 15 and communicating with the interior of the tube through an opening 20, the arrangement being such that in all angular positions of the capsule 16 about its axis the receiving end of passage 18 will always be below tube 15 and therefore within any body of liquid contained in the capsule. Capsule 16 is provided with a suitable filling tube 21 through which a desired quantity of liquid may be introduced into the capsule and chamber 14, and its outer end thereafter sealed.

Associated with the capsule 16 is an electrical heating coil 25. The capsule 16 is suitably supported in the interior of the main body 10 and conveniently isolated from cup 11 by a partition 26.

Head 12' of bellows 12 is provided with a stem 30 projected loosely through a bearing boss 31 and splined therein, to prevent rotation of the stem, by means of a pin 32 and key-way 33. Axially adjustable upon stem 30 is a collar 35 to which is secured an arm 36, conveniently of bakelite or some other suitable insulating material. Slidably mounted upon the outer end of arm 36 is a metal clip 37 adjustable upon the arm by means of a screw 38 passed through the clip and threaded into the arm as indicated at 39.

A clamping screw 40, passing loosely through the clip and arm, serves to firmly hold the clip in adjusted position. A bearing boss 41 is carried by one arm of clip 37 and in this boss is journaled a pin 42 which, at its outer end, carries a contact plate 43. Pin 42 may be rotatably adjusted and is held in adjusted position by the clamping screw 44, the arrangement being such that plate 43, in the general direction of the axis of stem 30, may be set at any desired angle relative to said axis.

A contact point 50 coacts with the contact plate 43 and is so mounted as to be shiftable toward and from said plate in a plane which lies at an angle to the plane of movement of the plate. Contact point 50 is therefore carried by an arm 51 having a pair of oppositely-directed fingers 51', 51' which are seated upon the outer ends of two independently movable bi-metallic thermostatic blades 52 and 53 with which are respectively associated heating coils 54 and 55, the arrangement being such that equal heating of the two blades will shift contact point 50 in a plane parallel with that dimension of contact plate 43 which is transverse to the plane of movement of the contact plate determined by the axis of stem 30, and such that unequal heating of blades 52 and 53 will shift contact point 50 laterally toward or from contact plate 43. The outer end of stem 30 is bifurcated, as indicated at 60 and provided with an anti-friction roller 61 which is seated in notch 62 formed in the inner edge of a power-delivery lever 63 pivoted at 64 upon base 10 and projected between guide fingers 65, also carried by base 10. A spring 66 acts upon lever 63 and serves to normally expand bellows 12.

The stem 30 may be considered the power delivery element of this structure and it should be understood that the particular mechanism which is to be positioned by the power delivery element, or the train of mechanisms, as for instance lever 63, between the power delivery element 30 and the device which is to be positioned, may be varied through a wide range without departing from my invention.

In the particular structures shown the loose fit of stem 30 in boss 31 is provided in order that the upper end of the stem, where it is associated with lever 63, may be permitted the necessary slight lateral play due to the character of connection between the stem and the lever.

Turning now to wiring diagram (Fig. 4):

A resistance coil 70 has one end connected by wire 71 with coil 54 and its other end connected by wire 72 with a binding post B. Similarly a resistance coil 73 has one end connected by wire 74 with coil 55 and its other end connected by wire 74 with binding post W. A wire 75 connects arm 51 (and contact point 50) with binding post P. Coils 54 and 55 are electrically connected respectively to the blades 52 and 53. The wire 75 affords an electrical connection through arm 51 and its fingers 51' with the blades 52 and 53 but as this connection is not a very dependable one, binding post P is connected by a branched bus bar 76 with the two blades 52 and 53. A bus bar 77 connects binding post R with a binding post P'. Wires 80 and 81 connect terminals P' and P with the secondary 82 of a transformer T and in wire 81 there may be placed, if desired, a limit-device L comprising a fixed terminal 83 and a responsive terminal 84 so arranged that whenever the device L is subjected to a predetermined condition, as for instance an undesirable maximum temperature, the energizing circuit will be broken at 83—84.

The primary 85 of the transformer is connected to the line wires 86 and 87.

The heating of coils 54 and 55 is determined by a Wheatstone bridge circuit comprising a wire 90 connecting post W with one end of coil 91, a wire 92 connecting the other end of said coil with binding post B, a wire 93 connected to binding post R and to the movable contact arm 94 arranged to sweep coil 91.

The arm 94 is, or is associated with, an element automatically responsive to conditions local to said element. That is to say, it may be a bi-metallic, or other, thermostatic element, a pressure static element, or other, desirable automatic variable. In Fig. 4 this arm 94 is indicated as a well-known bimetallic thermally-responsive blade which, upon variation of temperature of the ambient medium will cause an arcuate movement of the outer end of the blade.

A wire 95 connects binding post P' with one end of heating coil 25 and the other end of said coil is connected by wire 96 with contact plate 43.

If desired wires 75 and 95 might be connected to a high voltage source through a limit device L. (Fig. 5.) Sufficient volatile liquid is introduced into cup 14 and capsule 16 to compress the bellows 12 to about the limit of its stroke and to provide sufficient volume of liquid to cover the inlet end of passage 18 in all possible positions of the capsule 16 wherever the structure may be located.

The operation is as follows:

The parts are so proportioned that when arm 94 contacts with the middle of coil 91 the two heating coils 54 and 55 will equally affect the two blades 52 and 53 and contact point 50 will occupy a medial lateral position relative to the plane of plate 43. Under such conditions it will be noticed that variations in the ambient medium surrounding blades 52 and 53 or variations in voltage of the energizing current will not serve to shift contact point 50 laterally of the plane of contact plate 43. Shifting of arm 94 to one side or the other of the middle of coil 91 causes a variation of heating effects of coils 54 and 55 upon their respective blades 52 and 53, thereby causing a relative shifting of the free ends of said blades to produce a swinging movement of arm 51 and a consequent lateral movement of contact point 50 relative to the plane of contact plate 43. Whenever point 51 contacts with plate 43 current will flow through the circuit 82, 80, P', 95, 25, 96, 43, 50, 75, P, 81, 82, thus heating coil 25 to cause volatilization of a portion of the liquid in capsule 16 to create a pressure which will be transmitted hydraulically to the head of bellows 12 thus causing an axial shifting of stem 30 to retract plate 43 from point 50, whereupon coil 25 will be deenergized, capsule 16 will cool down, and plate 43 will be returned to contact with point 50 and the operation repeated. The plane of plate 43 being inclined to the plane of movement of point 50, a very small axial movement of stem 30 serves to make and break contact so that the power delivery element 30, and the parts actuated thereby, are maintained substantially at a predetermined position so long as here is no shifting of arm 94 with relation to coil 91. Any shifting of arm 94 upon coil 91 modifies the relative heating effects of coils 54 and 55 upon their blades 52 and 53 and there is a consequent shifting of point 50 relative to the plane of plate 43, and the heating effect upon capsule 16 will be correspondingly automatically varied to cause stem 30 to take up a new position, dependent upon the shifted position of arm 94, where it will be substantially maintained until there is another shift of arm 94.

It will be readily understood that the apparatus which I have described has a wide range of use. For instance, stem 30 or lever 63 may be connected to the dampers of a coal-burning furnace and the arm 94 may be the temperature-responsive blade of a room thermostat, and in such an arrangement the furnace dampers will be automatically positioned and maintained in any desired intermediate position, dependent upon the temperature-responsive position of the room thermostat. Or the stem 30, either directly or indirectly, may be connected to a valve which controls the flow of a fluid, or to a rheostat which controls the flow of current to a heating coil. Or, as stated above, the arm 94 may be responsive to variations in pressure.

It is thought to be unnecessary to illustrate any of the many possible modifications which have been indicated above because the present invention is not dependent upon those modifications but is, instead, the combination of the Wheatstone bridge thermostatic control of one of a pair of cooperating terminals the other of which is automatically positioned by a thermally-responsive motor the power delivery element of which is thereby modulated in its position in accordance with the resistance ratio of the Wheatstone bridge.

The resistance coils 70 and 73 are provided in order to minimize the effect of voltage variations when arm 94 is substantially offset from the middle of coil 91.

Fig. 5 differs from Fig. 4 in that the coil 25 is energized from the high tension leads 86 and 87, instead of from the secondary 82 and transformer T. In this arrangement the wire 950 connects coil 25 with lead 86 and wire 750 connects terminal 50 with lead 87 through a limit device comprising the thermostatic blade 840 and co-operating terminal 830.

I claim as my invention:

1. A modulating motor comprising a variable-volume chamber having a movable wall, a fixed-volume chamber in communication with said first-mentioned chamber, means by which the contents of said fixed-volume chamber may be intermittently heated, a contact plate connected to said wall, a contact point cooperating with said contact plate, means comprising two independently-movable thermally-responsive elements supporting said contact point for movement laterally of the line of movement of the contact plate upon differential movements of the thermally-responsive elements, said contact plate being arranged at an angle less than ninety degrees to the line of movement of the contact point.

2. A modulating motor comprising a variable-volume chamber having a movable wall, a fixed-volume chamber in communication with said first-mentioned chamber, means by which the contents of said fixed-volume chamber may be intermittently heated, a contact plate connected to said wall, means by which said contact plate may be set at various angles relative to its line of movement produced by the power delivery element, a contact point cooperating with said contact plate, means comprising two independently-movable thermally-responsive elements supporting said contact point for movement laterally of the line of movement of the contact plate upon differential movements of the thermally-responsive elements.

3. A modulating motor comprising, a variable-volume chamber having a movable wall, a fixed-volume chamber in communication with said first-mentioned chamber, a heating coil associated with said fixed-volume chamber, a pair of coacting contact elements one of which is movable by said wall, two independently-movable thermally-responsive elements supporting the other of said contact elements for movement laterally of the line of movement of its fellow upon differential movements of the thermally-responsive elements, and means by which said thermally-responsive elements may be independently heated, the contact movable by the wall having various portions at different distances from a plane normal to the other contact.

4. A modulating motor comprising, a variable-volume chamber having a movable wall, a fixed-volume chamber in communication with said first-mentioned chamber, a heating coil associated with said fixed-volume chamber, a pair of coacting contact elements one of which is movable by said wall, two independently-movable thermally-responsive elements supporting the other of said contact elements for movement laterally of the line of movement of its fellow upon differential movements of the thermally-responsive elements, means by which said thermally responsive elements may be independently heated, and means by which one of said contact elements may be set at various angles relative to its fellow and to the line of movement of the contact element under the influence of the movable wall.

5. A modulating motor comprising, a variable-volume chamber having a movable wall, two coacting contact elements one of which is connected to said wall, two independently-movable thermally-responsive elements supporting the other of said contact points for movement there of laterally of the line of movement of its fellow upon differential movements of the thermally-responsive element, means by which said thermally-responsive elements may be independently heated and means by which one of said contact elements may be set at various angles relative to its fellow and to the line of movement of the contact element under the influence of the movable wall.

6. A modulating motor comprising, a variable-volume chamber having a movable wall, two coacting contact elements one of which is connected to said wall, two independently-movable thermally-responsive elements supporting the other of said contact points for movement thereof laterally of the line of movement of its fellow upon differential movements of the thermally-responsive element, and means by which said thermally-responsive elements may be independently heated, the wall-carried contact having various portions at different distances from the plane normal to the other contact.

7. A modulating motor comprising a variable-volume chamber having a movable wall, a fixed-volume chamber in communication with said first-mentioned chamber, a heating coil associated with said fixed volume chamber, a pair of coacting contact terminals one carried by the movable wall, two independent thermally-responsive blades supporting the other of said contact elements for movement laterally of the line of movement of its fellow upon differential movements of said blades, and two heating coils one associated with each of said blades, the wall-carried contact having various portions at different distances from the plane normal to the other contact.

8. A modulating motor comprising a variable-volume chamber having a movable wall, a fixed-volume chamber in communication with said first-mentioned chamber, gravity-responsive means in said fixed-volume chamber forming an inlet communication between the fixed-volume chamber and the variable-volume chamber, a heating coil associated with said fixed-volume chamber, a pair of coacting contact terminals one carried by the movable wall, two independent thermally-responsive blades supporting the other of said contact elements for movement laterally of the line of movement of its fellow upon differential movements of said blades, and two heating coils one associated with each of said blades, the wall-carried contact having various portions at different distances from the plane normal to the other contact.

9. The combination, of a heat-responsive motor element having a power-delivery element, of a motor heating coil, an energizing circuit for said heating coil comprising a pair of coacting terminals, one of which is connected to the power-delivery element, a pair of independently-movable thermally-responsive elements supporting the other of said contact elements for movement laterally of the line of movement of its fellow upon differential movements of the thermally-responsive elements, two heating coils one for each of said thermally-responsive elements, a Wheatstone bridge one side of which is automatically-responsive to variations in a predetermined medium, an electric energy source, and connections between said source, said Wheatstone bridge and said last-mentioned two heating coils whereby variations of the Wheatstone bridge will vary the relative heating effects of said two last-mentioned heating coils upon their respective thermally-responsive elements.

10. A modulating motor comprising a variable volume chamber having a movable wall, an electrical heater for variably positioning said movable wall, two independently-movable thermally-responsive elements, two heating means one for each of said thermally-responsive elements, and two co-acting contact elements in the energizing circuit of said electrical heater, one carried by the movable wall and the other jointly by the two thermally-responsive elements and movable toward and from its fellow by differential movements of the two thermally-responsive elements.

11. A modulating motor comprising a power-delivery element, means comprising an electrical element for positioning said power-delivery element in accordance with variations of current delivery to said electrical element, two independently-movable thermally-responsive elements, two heaters, one for each of said thermally-responsive elements, means for variably affecting said heaters, an energizing circuit including the first-mentioned electrical element, and two co-acting separable terminals one associated with and variably positioned by the power-delivery element and the other associated with and variably positioned jointly by the two thermally-responsive elements and thereby movable toward and from its fellow by differential movements of the two thermally-responsive elements.

12. A modulating motor comprising a power-delivery element, means comprising an electrical element for positioning said power-delivery element in accordance with variations of current delivery to said electrical element, two independently movable thermally-responsive elements, two electric heaters, one for each of said thermally-responsive elements, energizing circuits for said heaters comprising means for variably energizing said heaters, an energizing circiut including the first-mentioned electrical element, and two coacting separable terminals one associated with and variably positioned by the power-delivery element and the other associated with and variably positioned jointly by the two thermally-responsive elements and thereby movable toward and from its fellow by differential movements of the two thermally-responsive elements.

13. Circuit controlling means comprising two independently movable thermally-responsive elements, two heaters, one for each of said elements, means by which said heaters may variably affect their respective thermally-responsive elements, a power-delivery element, two co-acting separable circuit terminals one associated with and variably positioned by the power delivery element and the other associated with both the thermally-responsive elements and variably positioned jointly thereby toward and from its fellow by differential movements of said two thermally-responsive elements, and a circuit including said two terminals and means dominating said power-delivery element.

14. A modulating system comprising, a heat-motor having a power-delivery element, an electric heater for said motor, an energizing circuit for said heater comprising two cooperating contacts one variably positioned by said heat motor, and means by which the other contact may be variably positioned, one of said contacts being a plate inclined relative to the line of movement of its fellow contact, and means by which said plate may be held at various inclinations.

15. A modulating system comprising in combination, an electric resistance, a terminal contactable with said resistance at various positions in its length, a pair of electrical devices, electrical connections connecting said resistance, said terminal, said pair of electrical devices and a source of power so that said pair of electrical devices will be variably energized in accordance with the relation of said terminal to said resistance, a contact positioned by the joint action of said pair of electrical devices, a second contact cooperable with the first contact, a heat motor controlling the position of said second contact, an electrical heater for the heat motor, and an energizing circuit including and controlled by said two contacts.

16. The combination of a pair of bimetallic blades each anchored at one end and with their free ends extending in opposite directions from the anchorages and arranged to equally deflect in the same general direction under similar temperature changes, and an arm pivotally anchored upon the free ends of both said blades by separated anchorages and with its free end projected transversely of the blades.

17. The combination of a pair of bimetallic blades each anchored at one end and with their free ends extending in opposite directions from the anchorages and arranged to equally deflect in the same general direction under similar temperature changes, an arm pivotally anchored upon the free ends of both said blades by separated anchorages and with its free end projected transversely of the blades, an electric heater arranged to affect one of said blades, and an electric heater arranged to affect the other of said blades.

18. The combination of a pair of oppositely-directed arms having free ends equally movable in the same general direction, means for causing movement of one of the arms, other means for causing movement of the other arm, and a third arm pivotally anchored upon the free ends of both said first-mentioned arms by separated anchorages and with its free end projected transversely of the first-mentioned arms.

19. The combination of a pair of bimetallic blades each anchored at one end, means for heating one of said blades, other means for heating the other blade, an arm pivotally anchored on the free ends of said blades at laterally-separated points, and an electric contact carried by the free end of said arm, of an electric contact plate having an extended area arranged parallel with the direction of movement of said first-mentioned contact under equal movement of the blades and at an angle to the direction of movement of said first-mentioned contact under unequal movement of the blades, and means to variably position said contact plate along the line at an angle to the plane of movements of the first-mentioned contact.

20. The combination of a pair of oppositely-projected bimetallic blades anchored at one end, means for heating one of said blades, other means for heating the other blade, an arm pivotally anchored on the free ends of said blades at laterally-separated points, and an electric contact carried by the free end of said arm, of an electric contact plate having an extended area arranged parallel with the direction of movement of said first-mentioned contact under equal movement of the blades and at an angle to the direction of movement of said first-mentioned contact under unequal movement of the blades, and means to variably position said contact plate along the line at an angle to the plane of movements of the first-mentioned contact.

21. The combination with a pair of laterally-movable pivotal anchorages, means to shift one of said anchorages, other means to shift the other anchorage, a swinging arm pivotally supported at laterally separated points on said anchorages, and an electric contact carried by said arm distant from its root, of an electric contact plate having an extended area parallel with movement of the first-mentioned contact under equal movement of said anchorages and at an angle to movement of the first-mentioned contact under unequal movement of said anchorages, and means to variably position said contact plate along the line at an angle to the plane of movements of the first-mentioned contact.

22. A modulating system comprising, a heat motor having a power delivery element, an electric heater for said motor, an energizing circuit for said heater comprising two cooperating contacts, one of which is a plate contact actuated by the heat motor with one dimension inclined at an angle to its heat motor line of movement and the other dimension of which is parallel to one line of movement of its fellow contact, means for variably positioning said fellow contact along the lines parallel with one dimension of the plate contact and also along lines transverse to the inclined dimension of said plate contact.

23. A modulating system comprising, a heat motor having a power delivery element, an electric heater for said motor, an energizing circuit for said heater comprising two cooperating contacts, one of which is a plate contact actuated by the heat motor with one dimension inclined at an angle to its heat motor line of movement and the other dimension of which is parallel to one line of movement of its fellow contact, means for variably positioning said fellow contact along the lines parallel with one dimension of the plate contact and also along lines transverse to the inclined dimension of said plate contact and means by which the angle of inclination of said plate contact may be adjusted.

24. A modulating system comprising, an electrically-operated power delivery element, an energizing circuit therefor comprising a pair of cooperable contacts, means by which one of said contacts is variably positioned by said power delivery element, thermally-responsive means associated with the other contact for variably positioning the same relative to its fellow contact, electric heating means for said thermally-responsive means, an energizing circuit for said heatsive means comprising a variable electric resisting means, and means responsive to variations in physical conditions at a predetermined point for variably adjusting said electrical resistance relative to the circuit in which it is incorporated.

25. Circuit controlling means comprising two independently movable thermally-responsive elements, two heaters, one for each of said elements, means by which said heaters may variably affect their respective thermally-responsive elements, a power-delivery element, and two coacting separable circuit terminals one associated with and variably positioned by the power delivery element and the other associated with both the thermally-responsive elements and variably positioned jointly thereby toward and from its fellow by differential movements of said two thermally-responsive elements.

26. A modulating system comprising, an electrically-operated power delivery element, a pair of cooperable contacts in control thereof, means by which one of said contacts is variably positioned by said element, means by which the other of said contacts is positioned in accordance with variations in a condition other than the condition of the electrically-operated power delivery element, and means by which one of said contacts may be adjusted relative to its fellow to vary the amount of movement of one contact necessary to compensate a given movement of the other contact.

PAUL F. SHIVERS.